US012222257B2

United States Patent
Ding et al.

(10) Patent No.: US 12,222,257 B2
(45) Date of Patent: Feb. 11, 2025

(54) OPTICAL RECEIVER PHOTODIODE TESTING USING TEST OPTICAL TERMINAL AT DIFFERENT LOCATION THAN OPERATIONAL OPTICAL TERMINAL

(71) Applicant: GlobalFoundries U.S. Inc., Malta, NY (US)

(72) Inventors: Hanyi Ding, Colchester, VT (US); Aidong Yan, San Jose, CA (US); Rongtao Cao, Essex Junction, VT (US)

(73) Assignee: GlobalFoundries U.S. Inc., Malta, NY (US)

( * ) Notice: Subject to any disclaimer, the term of this patent is extended or adjusted under 35 U.S.C. 154(b) by 275 days.

(21) Appl. No.: 17/657,175

(22) Filed: Mar. 30, 2022

(65) Prior Publication Data

US 2023/0314274 A1    Oct. 5, 2023

(51) Int. Cl.
   *G01M 11/00*    (2006.01)
   *G02B 6/42*     (2006.01)

(52) U.S. Cl.
   CPC ........... *G01M 11/00* (2013.01); *G02B 6/4206* (2013.01)

(58) Field of Classification Search
   CPC ....... G01M 11/00; G02B 6/4206; G02B 6/124
   See application file for complete search history.

(56) References Cited

U.S. PATENT DOCUMENTS

| 5,631,571 | A | 5/1997 | Spaziani et al. |
| 7,586,608 | B1 | 9/2009 | Gunn, III et al. |
| 8,000,565 | B2 * | 8/2011 | Liu ..................... G02B 6/12004 385/132 |
| 9,459,177 | B1 | 10/2016 | Dong et al. |
| 9,960,888 | B2 * | 5/2018 | Gloeckner ............ H04B 10/40 |
| 10,042,131 | B1 * | 8/2018 | Lesea ................. G02B 6/12004 |
| 10,145,758 | B2 | 12/2018 | Traverso et al. |
| 2020/0232878 | A1 * | 7/2020 | Ma ....................... G01M 11/331 |

FOREIGN PATENT DOCUMENTS

WO    WO-2019230372 A1 *    12/2019    ......... G02B 6/12002

OTHER PUBLICATIONS

Ives et al., "A Wideband On-Chip Radiator Driven by a Traveling-Wave Photodetector," STh3H.7, Conference on Lasers and Electro-Optics, OSA Technical Digest, 2019.

* cited by examiner

*Primary Examiner* — Tarifur R Chowdhury
*Assistant Examiner* — Roberto Fabian, Jr.
(74) *Attorney, Agent, or Firm* — Anthony Canale; Hoffman Warnick LLC

(57) ABSTRACT

A structure for testing a photodiode in a PIC using a grating coupler in optical communication with an optical terminal in a different location of the photodiode from another optical terminal used during operation of the PIC. The photodiode includes an operational optical terminal and a test optical terminal with the test optical terminal in a different location than the operational optical terminal. An optical component is in optical communication with the operational optical terminal of the photodiode and is used during operation of the photodiode and the PIC. A grating coupler is in optical communication with the test optical terminal of the photodiode for testing purposes.

18 Claims, 4 Drawing Sheets

OPTICAL RECEIVER PHOTODIODE TESTING USING TEST OPTICAL TERMINAL AT DIFFERENT LOCATION THAN OPERATIONAL OPTICAL TERMINAL

BACKGROUND

The present disclosure relates to photonic integrated circuits (PICs), and more specifically, to wafer-level testing a receiver photodiode in a PIC, like an optical receiver and transceiver, using a grating coupler in optical communication with a test optical terminal at a different location of the receiver photodiode to be tested from an operational optical terminal used during operation of the PIC.

Photonics integrated circuits (PICs) integrate electrical circuits with optical circuits. The PICs can include, among other things, electrical circuits and photonic receivers in the form of photodiodes, on a substrate. Optical signal paths are used in the PIC to direct an optical signal in a desired manner to, for example, the photodiode. It is beneficial to test the operation of the receiver photodiodes prior to use. For wafer level tests, a grating coupler may need to be formed on the substrate to permit a test optical signal to be transmitted into the optical signal path on the substrate communicating to the receiver photodiode. An optical probe is arranged above the grating coupler to transmit/receive the test optical signal into/from the grating coupler for the testing. Implementing a grating coupler for testing in a manner that does not cause impact to the PIC, or hinder later operation of the receiver photodiode, is challenging.

SUMMARY

An aspect of the disclosure is directed to a structure, comprising: a photodiode on a substrate, the photodiode including a first optical terminal and a second optical terminal, the second optical terminal in a different location than the first optical terminal of the photodiode; an optical component in optical communication with the first optical terminal of the photodiode; and a grating coupler in optical communication with the second optical terminal of the photodiode.

Another aspect of the disclosure includes a designed-for-test (DFT) structure for a photonic integrated circuit (PIC), the DFT structure comprising: a plurality of photodiodes on a substrate, each photodiode having a first optical terminal and a second optical terminal, the second optical terminal in a different location than the first optical terminal of the photodiode; a different optical component in optical communication with the first optical terminal of each photodiode of the plurality of photodiodes; and a grating coupler in optical communication with the second optical terminal of at least one selected photodiode of the plurality of photodiodes.

An aspect of the disclosure related to a method, comprising: optically communicating a test optical signal into a grating coupler in optical communication with a first optical terminal of a photodiode in a photonic integrated circuit (PIC), the first optical terminal being different than a second optical terminal of the photodiode through which an operational optical signal is optically communicated during operation of the PIC; and determining whether the photodiode is operational based on an electrical output of the photodiode and the test optical signal.

The foregoing and other features of the disclosure will be apparent from the following more particular description of embodiments of the disclosure.

BRIEF DESCRIPTION OF THE DRAWINGS

The embodiments of this disclosure will be described in detail, with reference to the following figures, wherein like designations denote like elements, and wherein.

Figure 1:
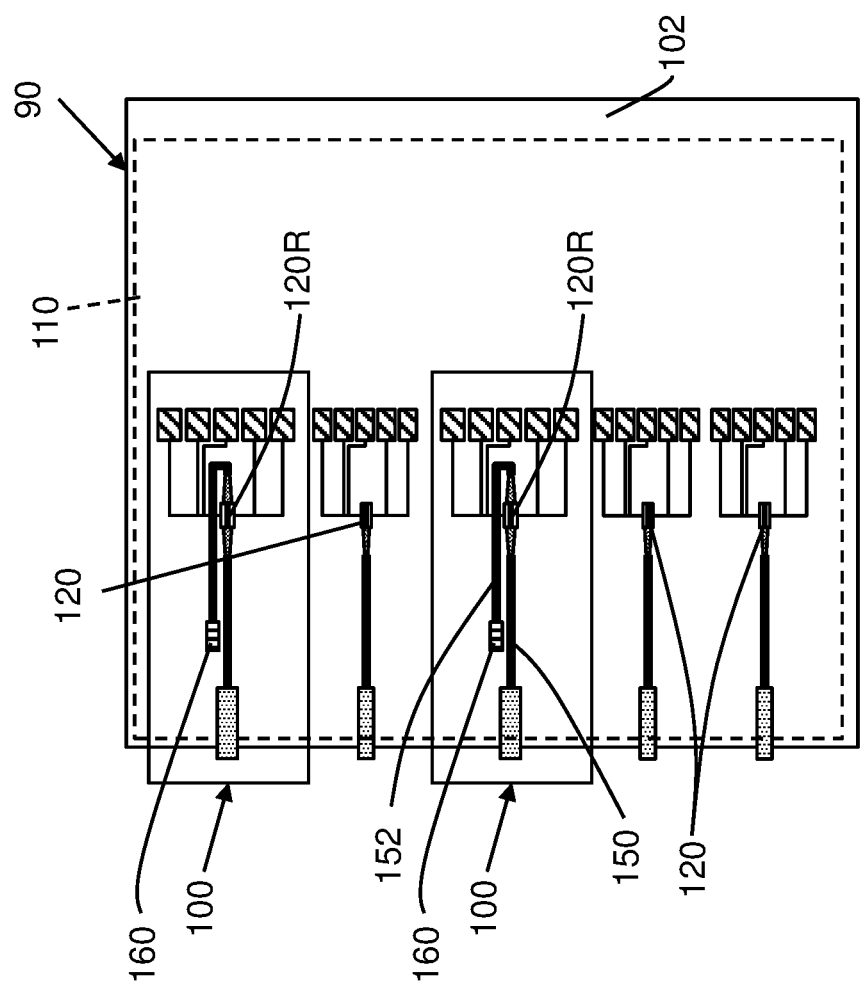
FIG. 1 shows a partial, schematic top down view of a photonic integrated circuit (PIC) die including a structure for testing a photodiode, according to embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific illustrative embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

It will be understood that when an element such as a layer, region, or substrate is referred to as being "on" or "over" another element, it may be directly on the other element or intervening elements may also be present. In contrast, when an element is referred to as being "directly on" or "directly over" another element, there may be no intervening elements present. It will also be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

Reference in the specification to "one embodiment" or "an embodiment" of the present disclosure, as well as other variations thereof, means that a particular feature, structure, characteristic, and so forth described in connection with the embodiment is included in at least one embodiment of the present disclosure. Thus, the phrases "in one embodiment" or "in an embodiment," as well as any other variations appearing in various places throughout the specification are not necessarily all referring to the same embodiment. It is to be appreciated that the use of any of the following "/," "and/or," and "at least one of," for example, in the cases of "A/B," "A and/or B" and "at least one of A and B," is intended to encompass the selection of the first listed option (a) only, or the selection of the second listed option (B) only, or the selection of both options (A and B). As a further example, in the cases of "A, B, and/or C" and "at least one of A, B, and C," such phrasing is intended to encompass the first listed option (A) only, or the selection of the second listed option (B) only, or the selection of the third listed option (C) only, or the selection of the first and the second listed options (A and B), or the selection of the first and third listed options (A and C) only, or the selection of the second and third listed options (B and C) only, or the selection of all three options (A and B and C). This may be extended, as readily apparent by one of ordinary skill in the art, for as many items listed.

Embodiments of the disclosure include a structure for wafer-level testing a photodiode in a photonic integrated circuit (PIC) using a grating coupler in optical communication with a test optical terminal that is in a different location of the photodiode from another, operational optical terminal used during operation of the PIC. The structure includes a photodiode on a substrate. The photodiode includes a test optical terminal and an operational optical terminal with the test optical terminal in a different location than the operational optical terminal of the photodiode, e.g., on opposing sides of the photodiode. An optical component includes, for example, an optical fiber or other optics device that outputs and/or receives an operational optical signal during use of the PIC. The optical component is in optical communication with the operational optical terminal of the photodiode used during operation of the PIC. The structure also includes a grating coupler in optical communication with the test optical terminal of the photodiode. The optical component and the grating coupler are optically coupled to the respective optical terminals of the photodiode by different, dedicated optical signal paths. In this manner, testing of the photodiode can be performed without the use of sacrificial grating couplers (built in the V-groove area before the V-groove process for wafer level tests) to avoid the risk of pad damage during the V-groove process. The testing can be performed after formation of V-grooves on the substrate. In addition, the grating coupler is in a dedicated optical signal path that optically communicates with a dedicated, test optical terminal of the photodiode for testing.

Consequently, the structure does not require additional components to couple the grating coupler into the operational optical signal path to the photodiode, so it does not interfere with later operation of the photodiode and the PIC. For example, there is no loss due to the presence of a coupler in the operational optical signal path. In addition, the power level for the testing does not have to be limited due to the coupler used.

Figure 2:
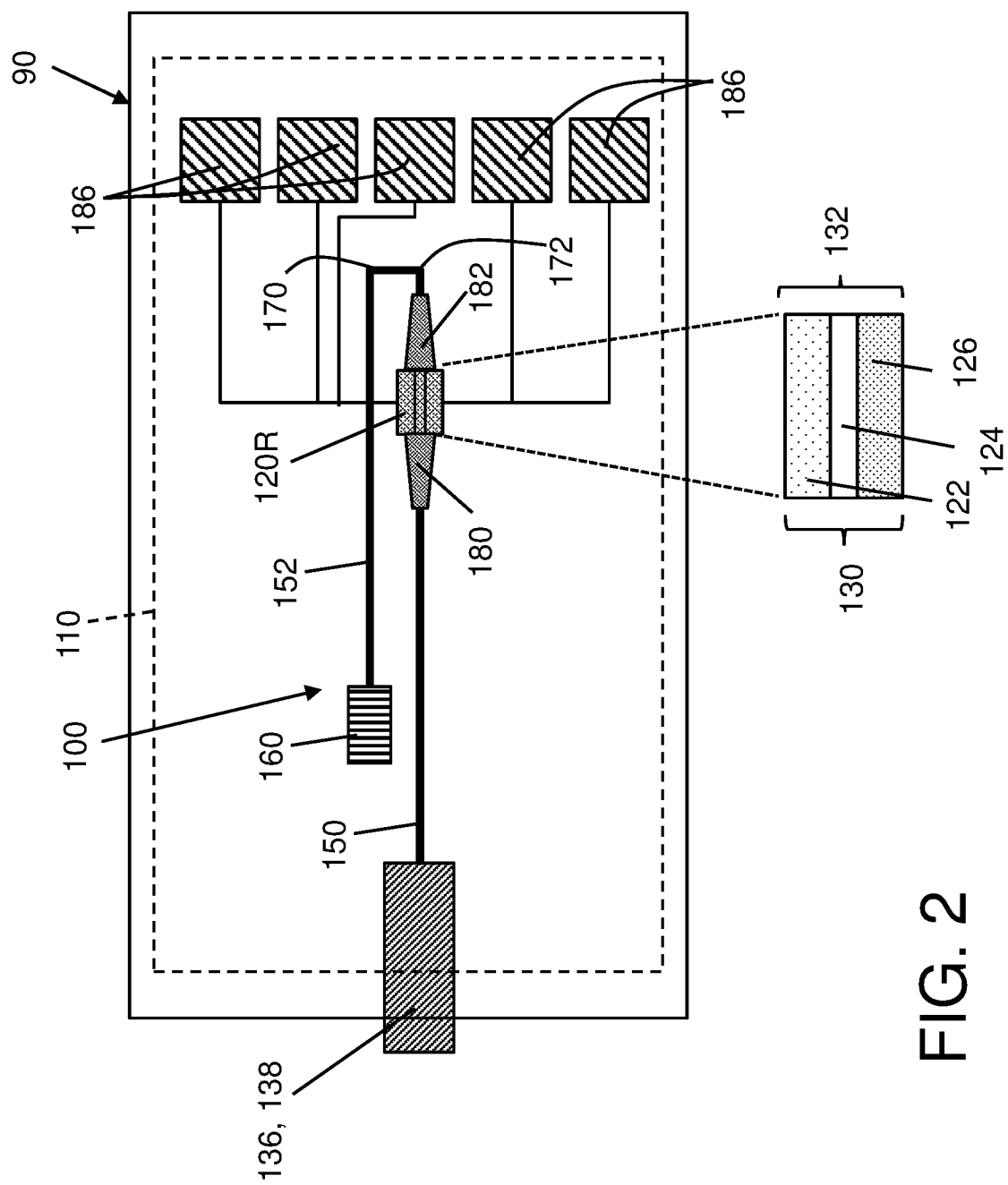
FIG. 2 shows an enlarged schematic top down view of the structure, according to embodiments of the disclosure.
Figure 3:
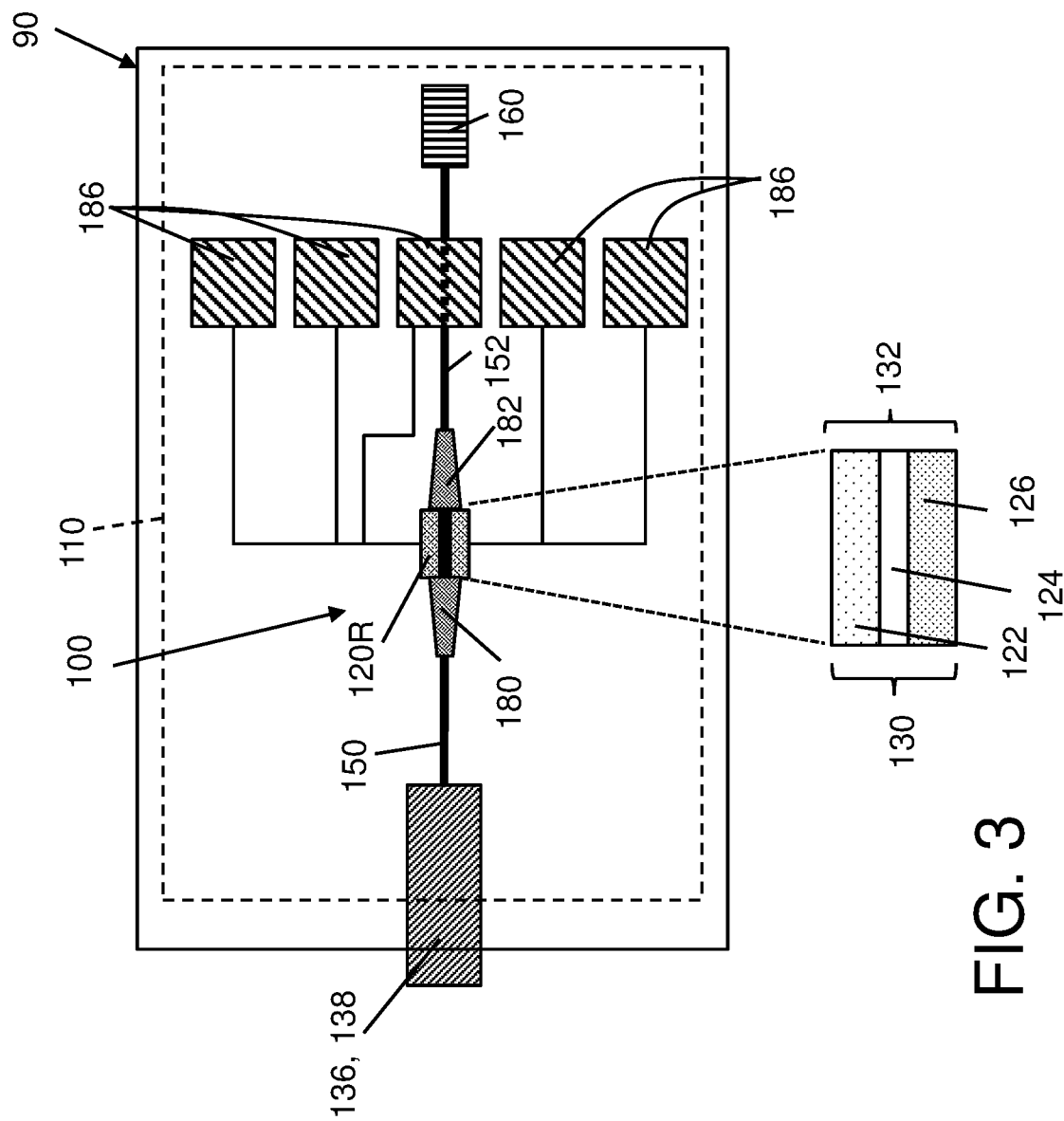
FIG. 3 shows an enlarged schematic top down view of the structure, according to alternative embodiments of the disclosure.
Figure 4:
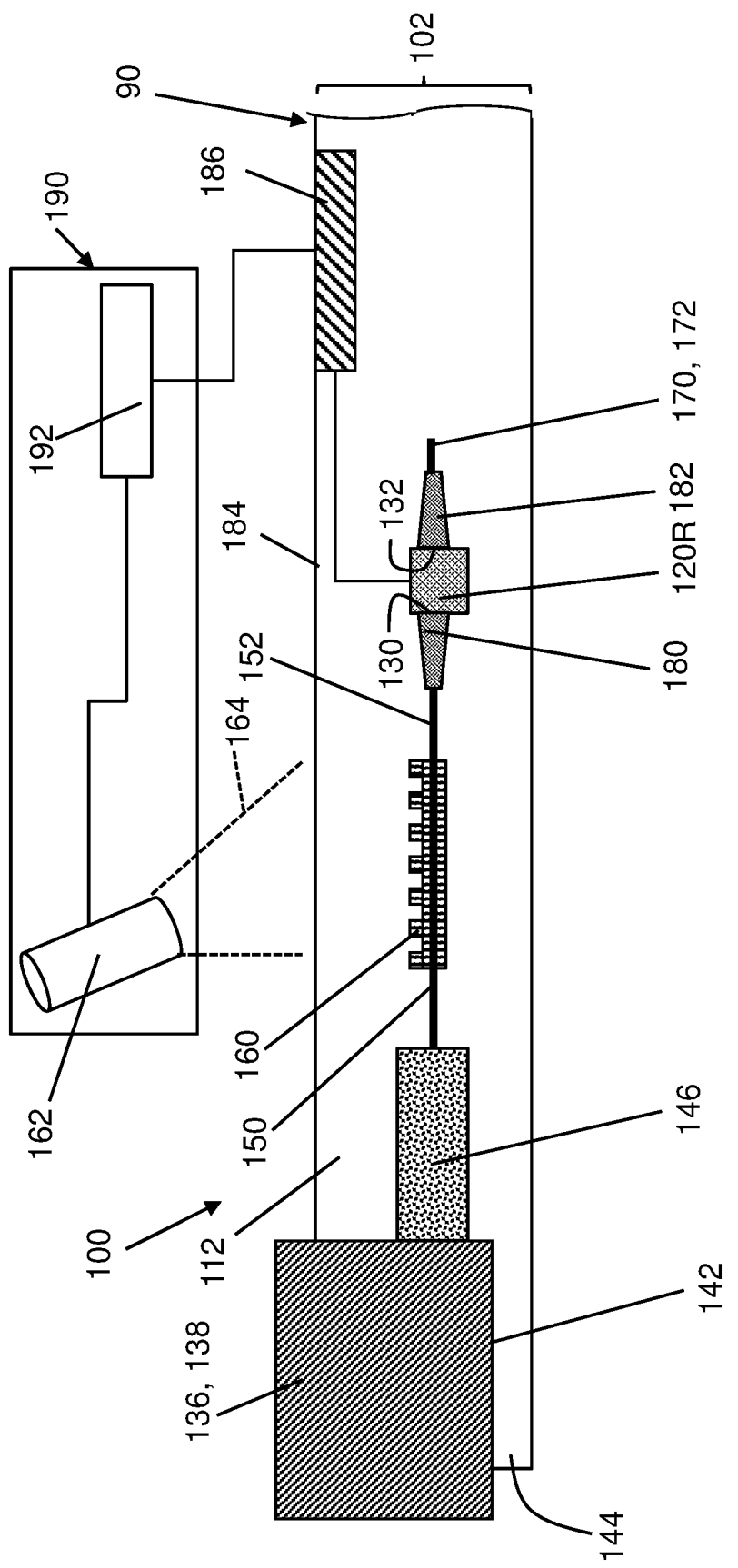
FIG. 4 shows a schematic side view of the structure, according to embodiments of the disclosure.

FIG. 1 shows a partial, schematic top down view of a photonic integrated circuit (PIC) 90 die including a structure 100 for testing a photodiode 120R, which is a photodiode in a receiver of the PIC, according to embodiments of the disclosure. FIG. 2 shows an enlarged schematic top down view of structure 100, FIG. 3 shows an enlarged schematic top down view of structure 100, and FIG. 4 shows a schematic side view of structure 100, according to various embodiments of the disclosure. As shown in FIG. 1, PIC 90 may include a plurality of photodiodes 120, only some of which are shown, including a receiver photodiode 120R in structure 100, according to embodiments of the disclosure. PIC 90 may otherwise include any now known or later developed photonics and/or integrated circuitry 110 (dashed box). Structure 100 may be referred to as a designed-for-test (DFT) structure or a test structure because use of parts thereof are exclusively for testing PIC 90.

Structure 100 is provided in a substrate 102 that forms part of a photonic integrated circuit (PIC) 90 die. Substrate 102 may include a number of different layers (not separately shown for clarity) in which structure 100, among other parts of PIC 90, are formed. More specifically, substrate 102 may include any now known or later developed semiconductor layer(s) in which any desired integrated circuitry may be located. To this end, substrate 102 may include but is not limited to layer(s) of silicon, silicon germanium, among possibly others. Substrate 102 may also include any now known or later developed interlayer dielectric layer(s) (ILDs) 112 (not individually shown for clarity) in which at least some parts of structure 100 may be located. ILD layer(s) 112 may include, for example, layers of silicon oxide, silicon nitride, among other ILD layers. As understood in the art, ILD layers 112 may include a variety of interconnects and/or passive elements (not shown for clarity) for coupling and/or scaling of parts of integrated circuitry, e.g., wires, contact vias, resistors, etc. Structure 100 may be positioned in one or more of ILD layers 112 and/or semiconductor layers adjacent thereto.

Structure 100 includes photodiode(s) 120 on substrate 102. Photodiode(s) 120 may include any now known or later developed photodetector structure capable of converting an optical signal to an electrical signal. In one non-limiting example, as shown in FIGS. 2-3, photodiodes 120 include a PIN-type photodetector including a p-type doped semiconductor region 122, an intrinsic semiconductor region 124, and an n-type doped semiconductor region 126. Each photodiode 120 has an operational optical terminal 130 and a typically unused optical terminal 132 which can be used for test (hereinafter "test optical terminal 132"). Test (unused) optical terminal 132 is in a different location than operational optical terminal 130 on the respective photodiode 120. For purposes of description, photodiodes 120 that are part of a PIC receiver and have a grating coupler 160 optically coupled to test optical terminal 132 are denoted as 'receiver photodiodes 120R'. As shown in FIG. 1, receiver photodiode(s) 120R may be selected photodiode(s) among a plurality of various photodiodes 120 in PIC 90. As will be further described, a grating coupler 160 is in optical communication with test optical terminal 132 of receiver photodiode 120R. Any number of structures 100 (including receiver photodiodes 120R with grating couplers 160) may be provided for a particular PIC 90.

Receiver photodiodes 120R include operational optical terminal 130 and test optical terminal 132, the latter of which is used for testing receiver photodiode 120R, as described herein. For purposes of description, optical terminal 130 is referred to as "operational optical terminal 130" because it is the terminal used during operation of PIC 90 after chip assembly, and optical terminal 132 is referred to as "test optical terminal 132" because it is used exclusively during testing. Test optical terminal 132 is in a different location than operational optical terminal 130 on receiver photodiode 120R. In one example, optical terminals 130, 132 are on opposing sides of receiver photodiode 120R. Each optical terminal 130, 132 provides an interface at which an optical signal can be received from a respective optical signal path 150, 152 for conversion by receiver photodiode 120R to an electrical signal. By design, an optical signal, e.g., light, received by either optical terminal 130, 132 cannot pass through receiver photodiode 120R in a manner sufficient to be received by, i.e., communicate out of, the other terminal of receiver photodiode 120R.

As shown in FIGS. 2-4, structure 100 also includes an optical component 136 in optical communication with operational optical terminal 130 of receiver photodiode 120R. Optical component 136 may include any now known or later developed optical device for communicating or generating an optical signal to operational optical terminal 130 of receiver photodiode 120R for conversion to an electrical signal during operation of PIC 90. Optical component 136 may be built on or in substrate 102 or may be coupled to substrate 102 in any now known or later developed fashion. For purposes of description, optical component 136 is illustrated as an optical fiber 138; however, it can take a variety of forms, e.g., laser, modulator, etc. Where optical component 136 includes an external device, such as an optical fiber, it may be positioned in V-grooves or U-grooves 142 (FIG. 4) in an edge 144 (FIG. 4) of substrate 102. Optical fibers 138 may be otherwise coupled to substrate 102 in any now known or later developed fashion. As shown in FIG. 2, different operational optical components 136 may be used in optical communication with operational optical terminals 130 of receiver photodiodes 120R. That is, each receiver photodiode 120R (and/or each photodiode 120) may have a different optical component 136 coupled thereto.

In certain embodiments, shown in FIG. 4, structure 100 may include spot size converter (SSC) 146 designed to efficiently couple to an external light-carrying medium (e.g., laser, optical fiber, etc.) of optical component 136. Where provided, SSC 146 reduces optical losses during transfer of an optical signal from optical component 136 to an optical signal path 150. In some cases, the optical losses can be significant where optical signal path 150 is directly coupled to optical component 136. SSC 146 can eliminate the need for lenses between optical component 136 and optical signal path 150. In alternative embodiments, as shown in FIGS. 2-3, SSC 146 can be omitted, and optical component 136 arranged to directly communicate with optical signal path 150. In FIG. 2, for example, optical component 136 may be butt-coupled to optical signal path 150 for transmitting an optical signal directly into PIC 90 without the need for lenses or other focusing devices.

Structure 100 also includes a grating coupler 160 in optical communication with test optical terminal 132 of receiver photodiode(s) 120R. Photodiodes 120 other than the at least one receiver photodiode 120R are devoid of grating coupler 160 in optical communication with test optical terminal 132. Grating coupler 160 permits an optical signal to be transmitted into (or received from) test optical signal path 152 on substrate 102 for testing operation of receiver photodiode 120R using an optical probe 162 arranged above grating coupler 160. Grating coupler 160 converts a generally vertical test optical signal 164 from optical probe 162 that is outside of substrate 102 into or out of a typically horizontal test optical signal path 152 on substrate 102. As illustrated in FIG. 1, receiver photodiode 120R may be one of several of photodiodes 120 on substrate 102. In certain embodiments, only a select number of the plurality of photodiodes 120 include test structure 100. The number of receiver photodiodes 120R in PIC 90 that include test structure 100 can be user defined based on, for example, the number of receivers and/or the extent of the desired testing. In this regard, at least some other photodiodes 120 of the plurality of photodiodes include optical component 136 in optical communication with operational optical terminal 130 thereof but are devoid of grating coupler 160 in optical communication with the other, unused optical terminal 132 thereof. These other photodiodes 120 can be used for other purposes, e.g., monitoring.

With further regard to optical signal paths 150, 152, each optical component 136 is in optical communication with operational optical terminal 130 of a respective photodiode 120, 120R via an operational optical signal path 150. Similarly, grating coupler 160 is in optical communication with test optical terminal 132 of receiver photodiode 120R via test optical signal path 152. Test optical signal path 152 for grating coupler 160, in contrast to conventional test structures, is separate from operational optical signal path 150. That is, each optical signal path 150, 152 is dedicated to its respective optical signal source. Grating coupler 160 not being coupled to the same optical signal path 150 that optical component 136 uses provides a number of advantages. For example, structure 100 does not require additional components, e.g., a waveguide coupler, to couple grating coupler 160 into operational optical signal path 150 to receiver photodiode 120R. As a result, grating coupler 160 does not interfere with later operation of optical component 136 and receiver photodiode 120R, and there is no loss due to the presence of grating coupler 160 in the operational optical signal path 150. The testing optical power is not limited due to the waveguide coupler used in the operational optical signal path 150. Grating coupler 160 and the rest of structure 100 can also be a permanent part of PIC 90, allowing testing of receiver photodiode 120R without using sacrificial grating couplers, which are otherwise formed in the V-groove area and require the tests to be done before the V-groove process with a risk of pad damage during the V-groove process. The testing can also be performed at any time, e.g., after formation of optical fiber V-grooves 142 to avoid the risk of pad damage during the V-groove process when testing is done before the V-groove process.

Optical signal paths 150, 152 may include any now known or later developed material capable of optically communicating or transmitting an optical signal and may alternatively referred to as "waveguides." Spot size converter (SSC) 146 may include the same or different material as optical signal paths 150, 152. For example, SSC 146 and/or optical signal paths 150, 152 may be made of silicon, silicon nitride or silicon oxy-nitride. SSC 146 and optical signal paths 150, 152 may be made using any technique.

In FIGS. 1 and 2, operational optical signal path 150 is shown as generally linear; however, it may include any number of turns to route the optical signal to photodiode 120, 120R around other structure in PIC 90. Operational optical signal path 150 includes a first end in optical communication with optical component 136 (perhaps using spot size converter 146 (FIG. 4)) and a second end in optical communication with operational optical terminal 130 of photodiode 120R. Grating coupler 160 is in optical communication with test optical terminal 132 of receiver photodiode 120R via test optical signal path 152 on substrate 102. As shown in FIGS. 2 and 3, test optical signal path 152 includes a first end in optical communication with grating coupler 160 and a second end in optical communication with test optical terminal 132 of photodiode 120R. Test optical signal path 152 may also include linear portions, and perhaps turn portions, to route the optical signal from grating coupler 160 around other structure in PIC 90. In certain embodiments, as shown in FIG. 2, test optical signal path 152 may include at least two turns 170, 172 in a horizontal plane to allow routing of an optical signal from grating coupler 160 to test optical terminal 132, i.e., on an opposite side of receiver photodiode 120R from operational optical terminal 130. (In FIG. 4, optical signal paths 150, 152 are at the same depth and hence are shown overlapping). In the example shown in FIG. 2, test optical signal path 152 extends along a side of photodiode 120R and includes a U-turn (combination of turns 170, 172) in a horizontal plane, to route it to test optical terminal 132. In an alternative embodiment, shown in FIG. 3, grating coupler 160 may be on an opposing side of receiver photodiode 120R from optical component 136, and test optical signal path 152 may include a linear path (and perhaps turns (not shown)) in a horizontal plane to allow routing of an optical signal from grating coupler 160 to test optical terminal 132. Here, test optical signal path 152 is entirely on an opposite side of receiver photodiode 120R from operational optical terminal 130. (Note, part of test optical signal path 152 may pass under a contact pad 186). In any event, it will be observed that an operational optical signal, i.e., from optical component 136 during operation of PIC 90, in second end of operational optical signal path 150 is communicated in a direction opposite to a test optical signal, i.e., from grating coupler 160 during testing, in the second end of test optical signal path 152. In FIGS. 2 and 3, operational optical signal, i.e., from optical component 136 during operation of PIC 90, in second end of operational optical signal path 150 would pass into operational optic terminal 130 heading to the right on the page. In contrast, test optical signal, i.e., from grating coupler 160 during testing, in the second end of test optical signal path 152 would pass into test optical terminal 132 heading to the left on the page.

Although not necessary in all instances, operational optical signal path 150 may include a first diverging waveguide or waveguide taper 180 at the second end thereof, and test optical signal path 152 may include a second diverging waveguide or waveguide taper 182 at the second end thereof. That is, each optical signal path 150, 152 may include a diverging waveguide or waveguide taper 180, 182, respectively, at a second end thereof where they respectively meet optical terminals 130, 132 of receiver photodiode 120R. Diverging waveguides 180, 182 may assist in directing a respective optical signal to the appropriate optical terminal 130, 132 of receiver photodiode 120R, e.g., without additional lenses or focusing mechanisms. Diverging waveguides 180, 182 may be made of the same material as listed for optical signal paths 150, 152.

Photodiode(s) 120, 120R may be electrically coupled to an upper surface 184 (FIG. 4) of structure 100, i.e., of substrate 102. More specifically, two or more electric contact pads 186 may be electrically coupled to electrical outputs of each photodiode 120, and in particular, selected receiver photodiodes 120R for testing operation of the selected receiver photodiodes 120R. Contact pads 186 may be coupled to any now known or later developed test system 190. Test system 190 may include, among other structure, a test controller 192 operationally coupled to optical probe 162. Test controller 192 may coordinate transmission of test optical signal(s) 164 into grating coupler 160 to test the electric output of receiver photodiode(s) 120R in any now known or later developed fashion. More particularly, test controller 192 may optically communicate test optical signal 164 into grating coupler 160 that is in optical communication with test optical terminal 132 of receiver photodiode 120R in PIC 90. As noted, test optical terminal 132 is in a different than operational optical terminal 130 of receiver photodiode 120R through which an operational optical signal is optically communicated during operation of PIC 90. Test controller 190 can determine whether receiver photodiode 120R is operational based on an electrical output of receiver photodiode 120R at contact pads 186 and based on test optical signal 164. That is, test controller 190 can determine whether receiver photodiode 120R is operational based on electrical signals, or lack thereof, identified through contact pads 186. Operational optical terminal 130 of receiver photodiode 120R (and optical component 136) is non-operative during the testing (i.e., when test optical signal 164 is being communicated into grating coupler 160 in optical communication with test optical terminal 132 of receiver photodiode 120R), so as to not interfere in the testing. As noted, test optical terminal 132 and operational optical terminal 130 of receiver photodiode 120R are on opposite sides of the photodiode. Consequently, optically communicating test optical signal 164 includes communicating test optical signal 164 into test optical terminal 132 in a first direction (moving to left on page of FIGS. 2-3) along test optical signal path 152. Similarly, optically communicating an operational optical signal (from optical component 136) includes communicating the operational optical signal into operational optical terminal 130 in a second direction (moving to right on page of FIGS. 2-3) opposite to the first direction—because operational optical signal path 150 is separate from test optical signal path 152. Test optical terminal 132 of receiver photodiode 120R is non-operational during operation of PIC 90, i.e., when optically communicating the operational optical signal from optical component 136 to operational optical terminal 130 of receiver photodiode 120R. Hence, after testing, receiver photodiode 120R can be similarly used as any other photodiode 120 in PIC 90.

The testing may be performed prior to dicing of PIC 90 into separate dies from a wafer including a plurality of PICs 90, or it may be performed on individual PICs 90 after dicing a wafer. In any event, the manufacturer can identify which PICs 90 have photodiodes 120 that are likely not functioning properly. PICs 90 with non-functioning receiver photodiodes 120R, i.e., with one or more receiver photodiodes 120R not operating within a predefined standard when tested, can be discarded. The testing can be completed prior to packaging, such as but not limited to after V-groove 142 formation for coupling of optical fibers. The testing prior to packaging can save the manufacturer the time and costs to package defective PICs 90.

Embodiments of the disclosure provide a system including an optical component and a grating coupler optically coupled to respective optical terminals of the photodiode by different optical signal paths. Testing of the photodiode can be performed without having to form, then remove, sacrificial grating couplers that require the tests to be done before the V-groove process with a risk of pad damages during the V-groove process. The testing can also be performed after formation of optical fiber seats, e.g., V-grooves, in the substrate. In addition, the grating coupler is in a dedicated optical signal path that optically communicates with a dedicated optical terminal of the photodiode for testing. Hence, the structure does not require additional structure, e.g., a waveguide coupler, to couple the grating coupler into the operational optical signal path to the photodiode. As a result, the grating coupler does not interfere with later operation of the optical component and the photodiode, and there is no loss due to the presence of a grating coupler in the operational optical signal path. The testing optical power does not have to be limited due to the waveguide coupler used to the operational optical signal path or the photodiode.

The method as described above is used in the fabrication and testing of PICs. The resulting integrated circuit chips can be distributed by the fabricator in raw wafer form (that is, as a single wafer that has multiple unpackaged chips), as a bare die, or in a packaged form. In the latter case the PIC chip is mounted in a single chip package (such as a plastic carrier, with leads that are affixed to a motherboard or other higher level carrier) or in a multichip package (such as a ceramic carrier that has either or both surface interconnections or buried interconnections). In any case the PIC chip is then integrated with other chips, discrete circuit elements, and/or other signal processing devices as part of either (a) an intermediate product, such as a motherboard, or (b) an end product. The end product can be any product that includes PICs or other integrated circuit chips, ranging from toys and other low-end applications to advanced computer products having a display, a keyboard or other input device, and a central processor.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A structure, comprising:
   a photodiode on a substrate, the photodiode including a first optical terminal and a second, test optical terminal, the second, test optical terminal in a different location than the first optical terminal of the photodiode;
   an optical component in optical communication with the first optical terminal of the photodiode; and
   a grating coupler in optical communication with and coupled to the second, test optical terminal of the photodiode,
   wherein the optical component is in optical communication with the first optical terminal of the photodiode via a first optical signal path, and the grating coupler is in optical communication with the second, test optical terminal of the photodiode via a second optical signal path separate from the first optical signal path.

2. The structure of claim 1, wherein the photodiode is one of a plurality of photodiodes on the substrate, and wherein at least some other photodiodes of the plurality of photodiodes include the optical component in optical communication with the first optical terminal thereof but are devoid of the grating coupler in optical communication with the second, test optical terminal thereof.

3. The structure of claim 1, wherein the first optical terminal and the second, test optical terminal of the photodiode are on opposite sides of the photodiode, and the second optical signal path includes at least two turns in a horizontal plane.

4. The structure of claim 1, wherein the first optical terminal and the second, test optical terminal of the photodiode are on opposite sides of the photodiode, and the second optical signal path extends along a side of the photodiode and includes a U-turn in a horizontal plane.

5. The structure of claim 1, wherein the optical component includes an optical fiber operationally coupled to an edge coupler on the substrate, wherein the first optical signal path includes a first end in optical communication with the optical component and a second end in optical communication with the first optical terminal of the photodiode, and
   wherein the second optical signal path includes a first end in optical communication with the grating coupler and a second end in optical communication with the second, test optical terminal of the photodiode.

6. The structure of claim 5, wherein the first optical signal path includes a first diverging waveguide at the first end thereof, and the second optical signal path includes a second diverging waveguide at the second end thereof.

7. The structure of claim 5, wherein a first optical signal in the second end of the second optical signal path is communicated in a direction opposite to a second optical signal in the second end of the first optical signal path.

8. A designed-for-test (DFT) structure for a photonic integrated circuit (PIC), the DFT structure comprising:
   a plurality of photodiodes on a substrate, each photodiode having a first optical terminal and a second, test optical terminal, the second, test optical terminal in a different location than the first optical terminal of the photodiode;
   a different optical component in optical communication with the first optical terminal of each photodiode of the plurality of photodiodes; and
   a grating coupler in optical communication with and coupled to the second, test optical terminal of at least one selected photodiode of the plurality of photodiodes,
   wherein each different optical component is in optical communication with the first optical terminal of a respective photodiode via a first optical signal path, and the grating coupler is in optical communication with the second, test optical terminal of the at least one selected photodiode via a second optical signal path separate from the first optical signal path.

9. The DFT structure of claim 8, wherein the plurality of photodiodes other than the at least one selected photodiode are devoid of the grating coupler in optical communication with the second, test optical terminal.

10. The DFT structure of claim 8, wherein the first optical terminal and the second, test optical terminal of the at least one selected photodiode are on opposite sides of the at least one selected photodiode, and the second optical signal path includes at least two turns in a horizontal plane.

11. The DFT structure of claim 8, wherein the first optical terminal and the second, test optical terminal of the at least one selected photodiode are on opposite sides of the at least one selected photodiode, and the second optical signal path extends along a side of the at least one selected photodiode and includes a U-turn in a horizontal plane.

12. The DFT structure of claim 8, wherein the different optical components each include an optical fiber operationally coupled to an edge coupler on the substrate, wherein the first optical signal path includes a first end in optical communication with the optical component and a second end in optical communication with the first optical terminal of the photodiode, and wherein the second optical signal path includes a first end in optical communication with the grating coupler and a second end in optical communication with the second, test optical terminal of the at least one selected photodiode.

13. The DFT structure of claim 12, wherein the first optical signal path includes a first diverging waveguide at the first end thereof, and the second optical signal path includes a second diverging waveguide at the second end thereof.

14. The DFT structure of claim 12, wherein a first optical signal in the second end of the second optical signal path is communicated in a direction opposite to a second optical signal in the second end of the first optical signal path.

15. A method, comprising:
    optically communicating a test optical signal into a grating coupler in optical communication with a first, test optical terminal of a photodiode in a photonic integrated circuit (PIC), the first, test optical terminal being different than a second optical terminal of the photodiode through which an operational optical signal is optically communicated from an optical component during operation of the PIC; and
    determining whether the photodiode is operational based on an electrical output of the photodiode and the test optical signal,
    wherein the grating coupler is in optical communication with and coupled to the first, test optical terminal of the photodiode via a first optical signal path, and wherein the optical component is in optical communication with the second optical terminal of the photodiode via a second optical signal path separate from the first optical signal path.

16. The method of claim 15, wherein the second optical terminal of the photodiode is non-operational during the optically communicating of the test optical signal into the grating coupler in optical communication with the first, test optical terminal of the photodiode.

17. The method of claim 15, further comprising, during operation of the PIC, optically communicating the operational optical signal from the optical component to the second optical terminal of the photodiode, wherein the first, test optical terminal of the photodiode is non-operational during operation of the PIC.

18. The method of claim 17, wherein the first, test optical terminal and the second optical terminal of the photodiode are on opposite sides of the photodiode, and wherein:
    optically communicating the test optical signal includes communicating the test optical signal into the first, test optical terminal in a first direction along a first optical signal path, and
    optically communicating the operational optical signal includes communicating the operational optical signal into the second optical terminal in a second direction opposite to the first direction in a second optical signal path separate from the first optical signal path.

* * * * *